(12) United States Patent
Rose et al.

(10) Patent No.: US 9,100,718 B2
(45) Date of Patent: Aug. 4, 2015

(54) SYSTEM FOR SYNCHRONISING CONTENT WITH LIVE TELEVISION

(71) Applicants: Anthony Rose, London (GB); Adrian Spender, London (GB); Kerry Jones, London (GB); Michael Slater, London (GB)

(72) Inventors: Anthony Rose, London (GB); Adrian Spender, London (GB); Kerry Jones, London (GB); Michael Slater, London (GB)

(73) Assignee: BEAMLY LIMITED (GB)

( * ) Notice: Subject to any disclaimer, the term of this patent is extended or adjusted under 35 U.S.C. 154(b) by 0 days.

(21) Appl. No.: 13/918,551

(22) Filed: Jun. 14, 2013

(65) Prior Publication Data

US 2014/0373043 A1    Dec. 18, 2014

(51) Int. Cl.
| | |
|---|---|
| H04N 7/10 | (2006.01) |
| H04N 21/81 | (2011.01) |
| H04H 20/20 | (2008.01) |
| H04H 20/38 | (2008.01) |
| H04H 20/93 | (2008.01) |
| H04H 60/37 | (2008.01) |
| H04H 60/59 | (2008.01) |
| H04N 21/43 | (2011.01) |
| H04N 21/431 | (2011.01) |
| H04N 21/44 | (2011.01) |
| H04N 21/462 | (2011.01) |
| H04H 60/65 | (2008.01) |
| H04H 20/18 | (2008.01) |

(52) U.S. Cl.
CPC ............ *H04N 21/81* (2013.01); *H04H 20/18* (2013.01); *H04H 20/38* (2013.01); *H04H 20/93* (2013.01); *H04H 60/37* (2013.01); *H04H 60/59* (2013.01); *H04H 60/65* (2013.01); *H04N 21/4307* (2013.01); *H04N 21/4316* (2013.01); *H04N 21/44008* (2013.01); *H04N 21/4622* (2013.01); *H04N 21/812* (2013.01)

(58) Field of Classification Search
CPC ............ H04N 21/236; H04N 21/2668; H04N 21/2187; H04N 21/4316; H04N 21/26241; H04N 21/458; H04N 21/41407; H04N 21/478; H04N 21/812
USPC .................................................... 725/32–36
See application file for complete search history.

(56) References Cited

U.S. PATENT DOCUMENTS

| | | | |
|---|---|---|---|
| 7,478,414 B1 | 1/2009 | Glusker et al. | |
| 7,865,927 B2 * | 1/2011 | Brodersen et al. | ............ 725/109 |
| 2002/0112239 A1 | 8/2002 | Goldman | |
| 2004/0231003 A1 | 11/2004 | Cooper et al. | |

(Continued)

FOREIGN PATENT DOCUMENTS

| | | |
|---|---|---|
| EP | 1318672 A1 | 6/2003 |
| EP | 2251995 A1 | 11/2010 |

(Continued)

*Primary Examiner* — Mark D Featherstone
*Assistant Examiner* — Aklil Tesfaye
(74) *Attorney, Agent, or Firm* — Whitmyer IP Group LLC

(57) ABSTRACT

A computer system in which augmentation content can be provided to a client device. A receiver is provided in a server for receiving a live television signal. A matching engine can then identify a segment of television, based on fingerprinting techniques and can determine a time delay between the start time of the segment of television and its identification. A content retrieval unit can then select augmentation content based on the identified segment of television and the time delay, and this can be output to a client device. In this way the augmentation content can be selected so that it maintains synchronization with live television.

12 Claims, 4 Drawing Sheets

(56) References Cited

U.S. PATENT DOCUMENTS

| | | |
|---|---|---|
| 2005/0086682 A1 | 4/2005 | Burges et al. |
| 2007/0250901 A1* | 10/2007 | McIntire et al. ............... 725/146 |
| 2008/0208839 A1 | 8/2008 | Sheshagiri et al. |
| 2009/0077580 A1* | 3/2009 | Konig et al. .................... 725/34 |
| 2009/0144785 A1* | 6/2009 | Walker et al. ................. 725/105 |
| 2009/0228921 A1 | 9/2009 | Miki et al. |
| 2010/0031290 A1 | 2/2010 | Hua et al. |
| 2010/0130122 A1* | 5/2010 | Sridhar et al. ............... 455/3.01 |
| 2010/0205049 A1* | 8/2010 | Long et al. ................... 705/14.5 |
| 2010/0218211 A1 | 8/2010 | Herigstad et al. |
| 2010/0306805 A1 | 12/2010 | Neumeier et al. |
| 2010/0319015 A1 | 12/2010 | Remington |
| 2011/0078723 A1* | 3/2011 | Stettner et al. .................. 725/32 |
| 2012/0240144 A1 | 9/2012 | Rose |
| 2012/0240162 A1 | 9/2012 | Rose |
| 2012/0240177 A1 | 9/2012 | Rose |
| 2014/0115625 A1* | 4/2014 | McCoy et al. .................. 725/34 |
| 2014/0196077 A1* | 7/2014 | Gordon et al. .................. 725/31 |

FOREIGN PATENT DOCUMENTS

| | | |
|---|---|---|
| EP | 2276240 A2 | 1/2011 |
| KR | 20110071450 A | 6/2011 |
| WO | 2008101557 A1 | 8/2008 |
| WO | 2010112072 A1 | 10/2010 |
| WO | 2011093649 A2 | 8/2011 |

* cited by examiner

SYSTEM FOR SYNCHRONISING CONTENT WITH LIVE TELEVISION

FIELD OF THE INVENTION

This invention relates to a computer system and a corresponding method for selecting content that will augment live television, and synchronising the content and live television.

BACKGROUND OF THE INVENTION

A number of known techniques exist for identifying segments of live television and selecting appropriate content to enhance a viewing experience. Our co-pending U.S. patent application Ser. Nos. 13/424,084, 13/424,068 and 13/424,038 describe the identification of sections of live television based on audio and/or video fingerprinting techniques. A selection tool is described for selecting appropriate augmentation content whenever a section of live television matches a stored fingerprint. In this way the selection tool can recognise a particular clip in live television, such as an advertisement, and an augmentation content item can be displayed to the user whenever the television clip is played. An appropriate augmentation content item may be a "buy now" button that, upon selection, would direct the user to a website where they can buy the advertised product.

SUMMARY OF THE INVENTION

A problem has been identified in conventional systems whereby the augmentation content can lose synchronisation with live television. Thus, in certain instances the selected augmentation content may be unrelated to the section of live television currently being played. This is undesirable, and an object of the present invention is to resolve this problem.

According to the present invention there is provided a computer system for providing augmentation content related to segments of television, the computer system comprising one or more processors configured to: identify a segment of television, determine a time delay between the start time of the segment of television and the time at which augmentation content related to the segment can be displayed on a user device; select augmentation content based on the identified segment of television and the time delay; and output the selected augmentation content for display on the user device.

A time delay is typically introduced in the system between the start of a segment of television and the display of related augmentation content on the user device. This time delay typically comprises a number of components. One time delay component may be introduced if the identification of a segment of television is not immediate. Fingerprinting techniques may be used for identifying segments of television and these techniques typically take a variable length of time that can depend on the uniqueness of the relevant fingerprint. Another time delay may be introduced due to the time required to download augmentation content to the user device. The quantum of this delay may depend on one or more of the speed of the network used to download the augmentation content and the size of the augmentation content file. A further time delay may be introduced by the time required to render the augmentation content on the user device. This time delay may depend on one or more of the size of the augmentation content file and the processing speed of the user device.

The user experience of television can be enhanced by providing augmentation content. However, the augmentation content must keep pace with live television feed if it is to remain relevant. By making use of the time delay it is possible to select and display the augmentation content that can maintain synchronisation with live television.

Preferably the one or more processors are configured to determine the duration of the segment of television and to select the augmentation content based on the identified segment of television, the time delay and the duration of the segment. In one example, augmentation content may be selected in dependence on the ratio of the time delay to the overall duration of the corresponding segment.

The one or more processors may be configured to select augmentation content that is related to the identified segment of television only if the time delay is less than or equal to the duration of the segment. In these circumstances the segment of television will still be playing at the time of its identification. It is advantageous to select augmentation content that is related to the television segment because a user can interact with the augmentation content to enhance their experience of the television segment.

In one example the segment of live television may be an advertisement. The augmentation content can therefore be output for display while the advertisement is playing to enhance the user's experience. In certain examples the augmentation content may be an image, a text description, a hyperlink, a video, an interactive vote or a game.

Preferably the computer system comprises a user display device configured to receive and display the selected augmentation content. The user display device is preferably separate to a first viewing device on which a user watches the live television. In certain embodiments the display device may be a personal computer, tablet device, smart phone or personal digital assistant (PDA). In this way the user can watch television on a first device and engage with the augmentation content on a second device. Of course, in an alternative embodiment the user display device may be integrated with the first device on which the user watches the live television.

The duration of the selected augmentation content may be dependent on the time delay. The augmentation content may include a static feature such as an image or text that is displayed for a specific time period. Alternatively the augmentation content may be a dynamic feature such as a video or interactive game that has a particular duration. The duration of the augmentation content may be chosen specifically so that the augmentation content is synchronised with live television, once the time delay has been taken into account.

The duration of the selected augmentation content may be equal to the duration of the relevant television segment minus the time delay. In this way the duration of an augmentation item can be adjusted so that it begins when the television segments is identified and ends at the same time as the television segment.

In another arrangement a plurality of augmentation content items may be associated with each segment of television and one of the plurality of augmentation content items is selected based on the time delay. In one example the augmentation content may be a video. A plurality of versions of the video may be provided, each with a different duration. One of the videos may be selected so that the chosen video ends at substantially the same time as the segment of television.

Preferably the segment of television corresponds to an advertisement, and the segment is identified using fingerprinting techniques. Video and/or audio fingerprinting can be used to identify recurring segments of television, corresponding to advertisements. These recurring segments can then be identified when they appear in live television.

According to another aspect of the invention there is provided a computer system for providing augmentation content related to segments of television, the computer system comprising one or more processors configured to: identify a first segment of television, select first augmentation content having a first duration, based on the identified first segment of television; output the first augmentation content for display on a user device; identify a second segment of television; determine the finish time of the second segment of television and the finish time of the first augmentation content; select second augmentation content based on the finish time of the first augmentation content and the finish time of the second segment of television; and output the second augmentation content for display on a user device.

The properties of the second augmentation content can therefore depend on the relationship between the finish time of the first augmentation content and the finish time of the second segment of television. In particular the augmentation content may depend on the difference between the finish time of the first augmentation content and the finish time of the second segment of television.

Preferably the second augmentation content is displayed when the first augmentation content has finished. The second augmentation content may be related to the second segment of television if this is still playing when the first augmentation content has finished.

The one or more processors may be configured to select the second augmentation content only if the second segment of television has a finish time that is later than the finish time of the first augmentation content. In this way it is possible to skip the selection of the second augmentation content if the first augmentation content item is still playing at the finish time of the second segment of television. This is advantageous because it can prevent the augmentation content from losing synchronisation with live television.

In one example the first augmentation content may be played when the first augmentation content item is identified. The first augmentation content item may have a duration that is equal to the duration of the first segment of television. However, a time delay in the identification process may mean that the first augmentation content is still playing when the second segment begins its appearance in live television. The second augmentation content item may be skipped if the time delay means that it cannot be displayed at the same time as the second segment of television.

The one or more processors may also be configured to identify third and further segments of television, which may appear in a sequence of television advertisements. Augmentation content may be selected for each segment based on the finish time of the segment and the finish time of any other augmentation content on the user device.

According to another aspect of the invention there is provided a method of providing augmentation content related to segments of television, comprising the steps of: identifying a segment of television, determining a time delay between the start time of the segment of television and the time at which augmentation content related to the segment can be provided on a user device; selecting augmentation content based on the identified segment of television and the time delay; and outputting the selected augmentation content for display on the user device.

According to another aspect of the invention there is provided a computer readable storage medium having a computer program stored thereon, the computer program comprising processor readable instructions that, when executed, direct a device to perform actions comprising: identifying a segment of television, determining a time delay between the start time of the segment of television and the time at which augmentation content related to the segment can be provided on a user device; selecting augmentation content based on the identified segment of television and the time delay; and outputting the selected augmentation content for display on a user device.

According to yet another aspect of the invention there is provided a method of providing augmentation content related to segments of television, comprising the steps of: identifying a first segment of television, selecting first augmentation content having a first duration, based on the identified first segment of television; outputting the first augmentation content for display on a user device; identifying a second segment of television; determining the finish time of the second segment of television and the finish time of the first augmentation content; selecting second augmentation content based on the finish time of the first augmentation content and the finish time of the second segment of television; and outputting the second augmentation content for display on a user device.

According to a yet further aspect of the invention there is provided a computer readable storage medium having a computer program stored thereon, the computer program comprising processor readable instructions that, when executed, direct a device to perform actions comprising: identifying a first segment of television, selecting first augmentation content having a first duration, based on the identified first segment of television; outputting the first augmentation content for display on a user device; identifying a second segment of television; determining the finish time of the second segment of television and the finish time of the first augmentation content; selecting second augmentation content based on the finish time of the first augmentation content and the finish time of the second segment of television; and outputting the second augmentation content for display on a user device.

Apparatus features may be provided as corresponding method features and vice-versa.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
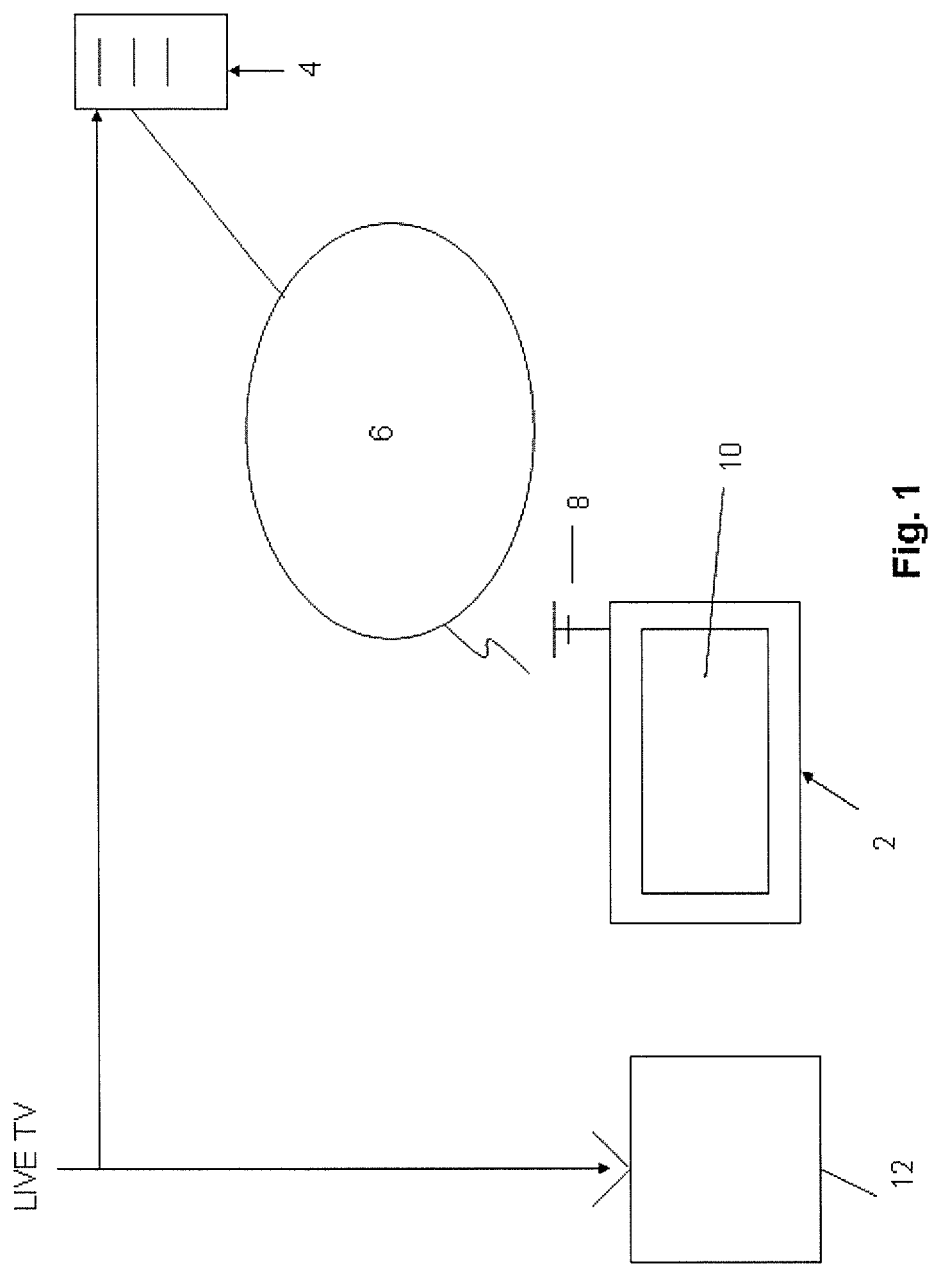
FIG. 1 is a schematic view of client and server devices in a network in an embodiment of the present invention.

FIG. 1 is a schematic view of a client device 2 and a server computer 4 in communication over a network 6 such as the internet. A television 12 is also provided as a primary viewing device, and both the television 12 and the server computer 4 are configured to receive a live television signal.

The client device 2 includes an aerial 8 or other communication means for use in transmitting and receiving data over the network 6. The client device 2 also includes a screen 10 that can be used both for displaying content and for receiving user inputs. In this embodiment the client device 2 is separate from the television 12, and it may be configured as a remote control, a personal computer, a tablet computer, a smart-phone or a personal digital assistant (PDA). In an alternative arrangement the client device 2 could be integrated together with the television 12.

Figure 2:
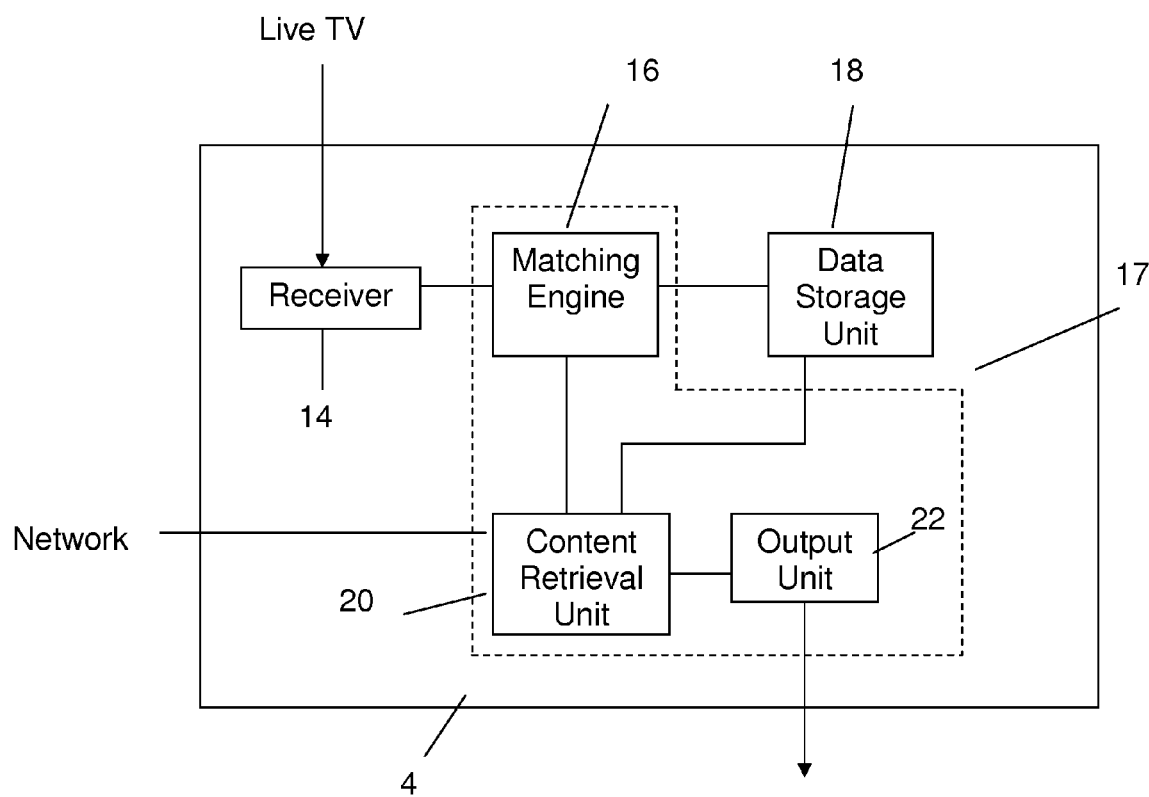
FIG. 2 is a schematic view of the components in a server device in an embodiment of the present invention.

Further detail of the server device 4 is provided in FIG. 2. The server device 4 includes a receiver 14 that is configured to receive the live television signal. A matching engine 16 is configured to match a fingerprint of the live television signal with known fingerprints stored in a data storage unit 18. A content retrieval unit 20 is configured to retrieve appropriate augmentation content from the data storage unit 18 or from the network 6, and an output unit 22 is configured to output the augmentation content for display on the client device 2. The matching engine 16, content retrieval unit 20 and output unit 22 are provided as modules in a central processing unit (CPU) 17.

The operation of the invention will now be described with reference to the flow diagram shown in FIG. 3 which begins at step 30 where the receiver 14 is configured to receive live television and send it to the CPU 17/matching engine 16.

At step 32 the matching engine 16 is configured to match a fingerprint or profile of the received live television with stored fingerprints in the data storage unit 18. Typically the stored fingerprints include signal properties plotted against time. The stored fingerprints typically relate to advertisements or other known sections of television. The matching engine 16 is configured to identify these known sections of television when they appear in the received signal.

The matching process does not provide an immediate result. The matching engine 16 requires a few seconds of television before a meaningful comparison can be made against stored fingerprints. A longer integration period may be required where there are small differences between stored fingerprints and/or where the television segment has few unique characteristics. For example, if an advertisement begins with a few seconds of blank background it may be difficult for the matching engine 16 to distinguish this from normal television. An even longer integration period may be required if two advertisements have similar characteristics, especially if they are similar in the first few seconds. The matching engine 16 operates in a continuous manner, analysing the received television signal until a match is identified.

Once a match has been identified the CPU 17 is further configured at step 34 to perform a number of calculations. Firstly, the matching engine 16 determines the anticipated finish time of the known segment of television. This can be calculated based on the detected start time of the segment and its known duration. Secondly, the matching engine 16 determines the time at which any existing augmentation content will finish playing on the client device 2; this may be determined using feedback from the client device 2, or by analysing instructions that have been sent to the client device 2 by the output unit 22. Thirdly, the matching engine will calculate whether the finish time of the known segment of television is later than the finish time of the current augmentation content; a null result is returned if no augmentation content is currently being played at the client device 2. Fourthly, the matching engine 16 calculates the time delay between the start of the relevant segment of television and the time at which augmentation content can be provided on the client device 2.

The time delay is typically comprised of several components. A major component is the time taken by the matching engine 16 to identify the segment. Additional components include the time taken to download the augmentation content to the client device 2 and the time taken to render the augmentation content on the client device 2. These additional components may be calculated based on the size of the relevant augmentation content file (or an average augmentation content file), the processing capability of the client device 2 and the network speed between the client device 2 and the server device 4.

At step 36 the matching engine 16 queries whether it has calculated a null result because no augmentation content is currently being played at the client device. In these circumstances the content retrieval unit 20 is configured at step 38 to select augmentation content that is appropriate to the identified television segment. Typically the augmentation content is stored in the data storage unit 18, although it may also be retrieved from the internet. The augmentation content may be an image, video or text file that the user can review while watching the advertisement or other segment of live television. In certain instances the augmentation content may be an interactive game or voting platform with which the user can engage with the advertisement. The selected augmentation content is typically displayed for a duration that is equal to the duration of the relevant television segment.

In one alternative example, at step 38, augmentation content may be selected so that its default duration is reduced by the value of the calculated time delay. In another example, a plurality of augmentation content items may be available for selection and the content retrieval unit 20 may use the calculated time delay to select the augmentation content with a finish time that is best synchronised to the finish time of the segment. In this way the augmentation content can retain synchronisation with live television in spite of the inherent delay in the identification process.

At step 40 the output unit 22 is configured to output the augmentation content retrieved by the content retrieval unit 20 so that it can be displayed on the client device 2. A user can then watch the television segment on a main display or television and interact with the segment using the augmentation content displayed on an auxiliary device.

Step 42 is performed in the circumstances where the CPU 17 detects that augmentation content is currently playing on the client device 2. Generally it is preferred that only a single augmentation content item is displayed on the client device 2 at any time. Therefore, the CPU 17 is configured to compare the finish time of the current augmentation content and the finish time of the presently identified segment. If the current or existing augmentation content is due to finish before the presently identified segment then the flow diagram shows that the procedure moves to step 38. At this point the content retrieval unit 20 selects augmentation content that is relevant to the segment. This can ensure that there is a non-zero temporal overlap in which the identified segment will be playing in live television and the newly selected augmentation content will be output on the user device. The augmentation content can therefore enhance rather than hinder a user's viewing experience.

If the currently playing augmentation content is due to finish after the presently identified segment then, at step 44, the selection of augmentation content is skipped. No augmentation content is selected in these circumstances in order to avoid presenting augmentation content for a segment of television that has already finished. This can improve synchronisation of augmentation content with live television. In an alternative arrangement a generic or default augmentation content item may be output, in place of augmentation content for the identified television segment.

The process then returns to step 30 and the matching engine 16 once more analyses live television for matching segments of television.

Figure 4:
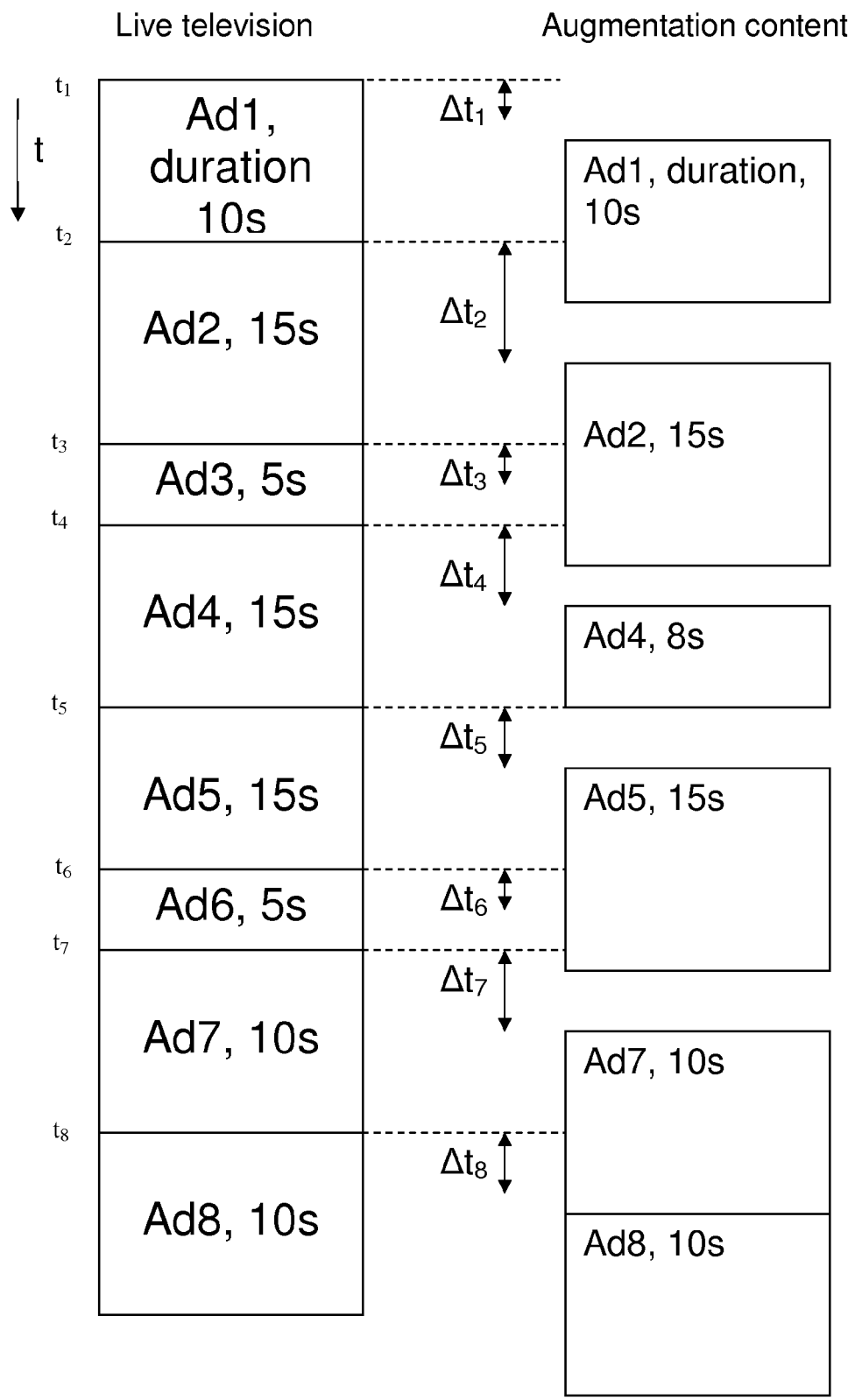
FIG. 4 is a diagram showing a sequence of advertisements in live television and the corresponding augmentation content that is output to a client device in an embodiment of the present invention.

FIG. 4 is a diagram showing a sequence of eight advertisements in live television and the augmentation content that is output to a client device 2 using an embodiment of the present invention. The first advertisement in the live television has a duration of 10 seconds. The matching engine 16 identifies the first advertisement using fingerprinting techniques. The CPU 17 then calculates a time delay $\Delta t_1$ between the start of the segment of television and the time at which augmentation content can be provided on the client device 2. The time delay $\Delta t_1$ includes several components. Firstly the time delay includes a component that is related to the time taken for the matching engine 16 to identify the first advertisement. Secondly, the time delay includes a component that is related to the time taken to download a typical augmentation content file to the client device 2. Thirdly, the time delay includes a component that is related to the time taken to render a typical augmentation content file on the client device 2.

Figure 3:
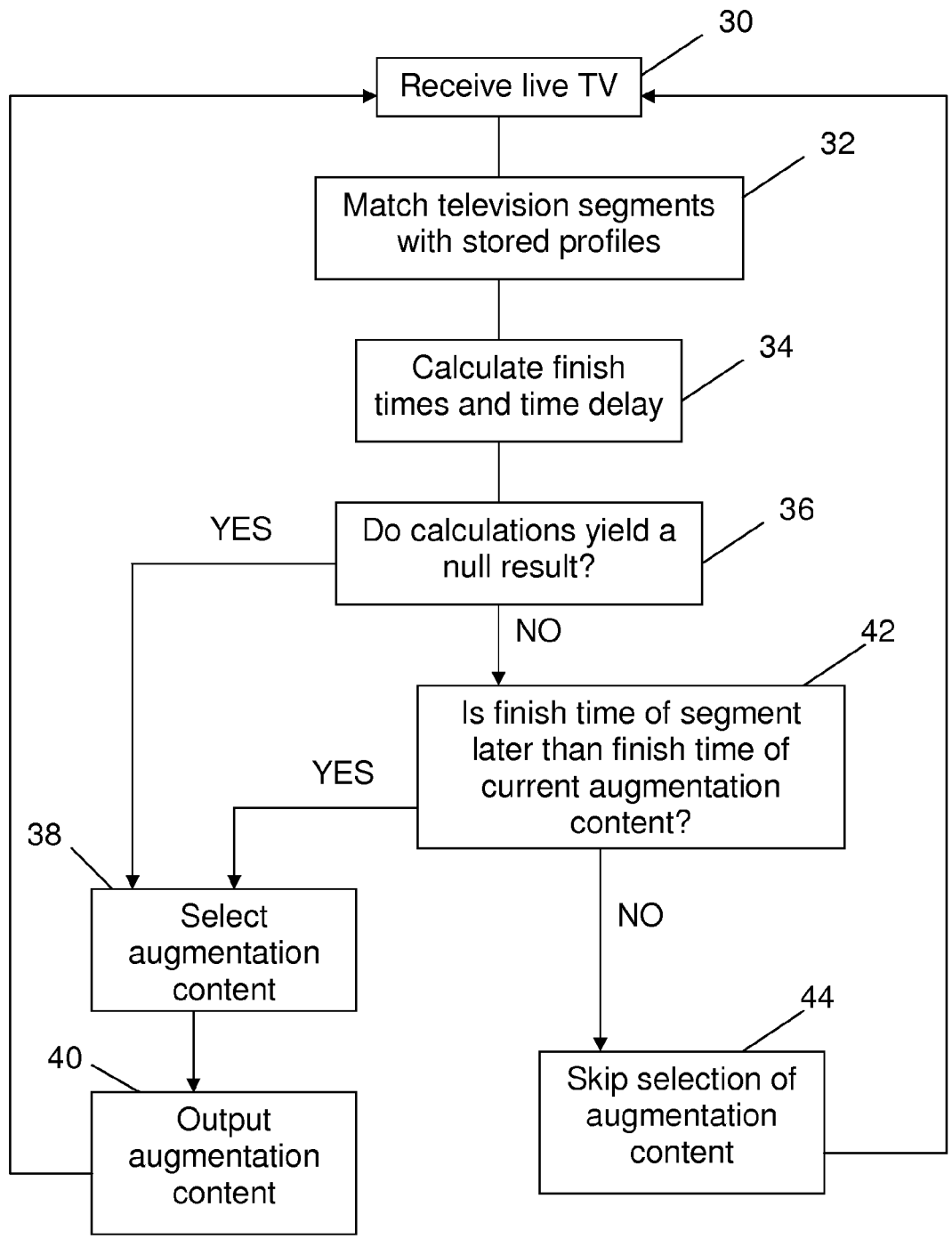
FIG. 3 is a flow diagram showing a sequence of steps that can be performed in a an embodiment of the present invention.

At time $t_1+\Delta t_1$ there is no augmentation content playing in the client device 2, and therefore the content retrieval unit 20 is configured to select appropriate augmentation content at step 38 in the flow diagram of FIG. 3. Specifically, the content retrieval unit 20 selects augmentation content that is directly related to the first advertisement and has the same duration which is 10 seconds in this example.

The second advertisement is identified by the matching engine 16, and time delay $\Delta t_2$ is calculated. At time $t_2+\Delta t_2$ there is no other augmentation content playing in the client device 2 since the first augmentation content has already finished. Therefore, the content retrieval unit 20 selects augmentation content that is related to the second advertisement and has the same duration.

The third advertisement is identified by the matching engine 16, and time delay $\Delta t_3$ is calculated. At time $t_3+\Delta t_3$, however, the augmentation content is still playing for the second advertisement. Therefore, at step 42 in the flow diagram of FIG. 3, the CPU 17 compares the finish time of the current augmentation content and the finish time of the presently identified segment of television. In this case the current augmentation content is due to finish after the presently identified segment. Therefore, at step 44 the selection of augmentation content is skipped. By skipping augmentation content for the third segment the output on the client device 2 can maintain synchronisation with the live television.

The fourth advertisement is identified by the matching engine 16, and time delay $\Delta t_4$ is calculated. At time $t_4+\Delta t_4$ there is no other augmentation content playing in the client device 2 as the augmentation content for the second advertisement has finished earlier. Therefore, the content retrieval unit 20 selects augmentation content that is related to the fourth advertisement. In this example the content retrieval unit 20 selects augmentation content that has a reduced duration. This can allow the client device 2 to maintain synchronisation with the live television. In this example reduced duration augmentation content can be selected for the fourth advertisement because a number of alternate augmentation content items were available for selection, each having a different duration; in this example alternate augmentation content items were not available for the first and second advertisement augmentation content items.

The fifth advertisement is identified by the matching engine 16, and an augmentation content item is retrieved as described above. For the sixth advertisement, again the augmentation content for the fifth advertisement is still playing and is scheduled to remain playing until after the sixth advertisement ends. Therefore, at step 44 the selection of augmentation content is skipped for the sixth advertisement. This can ensure that augmentation content on the client device 2 can maintain synchronisation with the live television.

The seventh advertisement is identified by the matching engine 16, and an augmentation content item is retrieved as described above. The eighth advertisement is identified by the matching engine 16, and time delay $\Delta t_8$ is calculated. At time $t_8+\Delta t_8$ the augmentation content for the seventh advertisement is still playing. However, the augmentation content item is scheduled to finish before the eighth advertisement. Therefore, the content retrieval unit 20 selects augmentation content that is related to the eighth advertisement and has the same duration.

What is claimed is:

1. A computer system for providing augmentation content related to segments of television, the computer system comprising one or more processors, which:
   identify a television advertisement being displayed on a first user device,
   determine a first time, which is a start time of the television advertisement displayed on the first user display device;
   determine a second time, which is a time at which augmentation content related to the identified television advertisement can be provided on a second user display device;
   determine a third time, which is an end time of the television advertisement displayed on the first user device;
   determine a non-zero time delay between the first time and the second time;
   determine a duration of the television advertisement, which is the difference between the first time and the third time;
   select augmentation content which is dependent on the value of the non-zero time delay relative to the duration of the identified television advertisement; and
   output the selected augmentation content for display on said second user display device,
   wherein the television advertisement is identified using fingerprint matching techniques.

2. The computer system of claim 1 wherein the time delay is based, at least in part, on the time needed to identify the television advertisement.

3. The computer system of claim 1 wherein the time delay is based, at least in part, on the time needed to deliver the augmentation content to the user device.

4. The computer system of claim 1 wherein the time delay is based, at least in part, on the time needed to render the augmentation content on the user device.

5. The computer system of claim 1 wherein the one or more processors select augmentation content that is related to the identified television advertisement only if the time delay is less than or equal to the duration of the advertisement.

6. The computer system of claim 1 wherein the duration of the selected augmentation content is dependent on the time delay.

7. The computer system of claim 6 wherein the duration of the selected augmentation content is equal to the duration of the television advertisement minus the time delay.

8. The computer system of claim 1 wherein a plurality of augmentation content items are associated with each television advertisement and one of the plurality of augmentation content items is selected based on the time delay.

9. The computer system of claim 1 wherein the augmentation content is at least one of: an image, a video, a hyperlink, an interactive game and text.

10. The computer system of claim 1 wherein the television advertisement corresponds to an advertisement.

11. A method of providing augmentation content related to segments of television, comprising the steps of:
   identifying a television advertisement being displayed on a first user display device, determining a first time, which is the start time of the television advertisement being displayed on the first user display device;

determining a second time, which is a time at which augmentation content related to the advertisement can be provided on a second user display device;

determining a third time, which is an end time of the television advertisement being displayed on the first user display device;

determining a non-zero time delay between the first time and the second time;

determining a duration of the television advertisement, which is the difference between the first time and the third time;

selecting augmentation content which is dependent on the value of the non-zero time delay relative to the duration of the television advertisement; and outputting the selected augmentation content for display on the second user display device, wherein the television advertisement is identified using fingerprint matching techniques.

12. A non-transitory computer readable storage medium having a computer program stored thereon, the computer program comprising processor readable instructions that, when executed, direct a device to perform actions comprising:

identifying a television advertisement being displayed on a first user display device, determining a first time, which is the start time of the television advertisement being displayed on the first user display device;

determining a second time, which is a time at which augmentation content related to the advertisement can be provided on a second user display device;

determining a third time, which is an end time of the television advertisement being displayed on the first user display device;

determining a non-zero time delay between the first time and the second time;

determining a duration of the television advertisement, which is the difference between the first time and the third time;

selecting augmentation content which is dependent on the value of the non-zero time delay relative to the duration of the television advertisement; and outputting the selected augmentation content for display on the second user display device, wherein the television advertisement is identified using fingerprint matching techniques.

* * * * *